United States Patent [19]

Meszaros

[11] 3,915,065

[45] Oct. 28, 1975

[54] OSCILLATING ACTION FLUID MOTOR

[76] Inventor: John Meszaros, 8357 Westlawn Ave., Los Angeles, Calif. 90045

[22] Filed: Mar. 4, 1974

[21] Appl. No.: 447,787

[52] U.S. Cl. .................. 91/343; 91/345; 91/346; 91/398; 92/136
[51] Int. Cl.² .................. F01L 23/00; F01L 31/02
[58] Field of Search ............. 91/398, 397, 341, 344, 91/346, 343, 345, 352, 353; 92/136

[56] References Cited
UNITED STATES PATENTS

| 761,366 | 5/1904 | Farnsworth | 91/341 R |
|---|---|---|---|
| 1,209,682 | 4/1929 | Moxley | 91/341 R |
| 2,670,719 | 3/1954 | Anderson et al. | 91/341 R |
| 2,804,055 | 8/1957 | Hill et al. | 91/346 |
| 3,205,830 | 9/1965 | Clack | 91/346 |
| 3,246,581 | 4/1966 | Carr | 92/136 |

*Primary Examiner*—Paul E. Maslousky
*Attorney, Agent, or Firm*—Robert J. Schaap

[57] ABSTRACT

An oscillating action fluid motor which comprises an outer housing having an interior fluid receiving chamber formed therein. A valve having an inlet port and an outlet port is also formed in the housing, and a closure member is movable with respect to the two ports to periodically open and close the inlet and outlet ports from a source of fluid under pressure. An arm is movable with the closure member and is connected to a piston, which extends in one direction upon entry of fluid under pressure into the interior chamber. A spring biases the piston in the opposite direction upon discharge of the fluid in the chamber through the outlet port. A coupling member automatically connects and disconnects the piston from the arm. Furthermore, a rack and pinion mechanism is operable by the piston. This latter mechanism drives an output shaft in an oscillating movement in response to the reciprocative action of the piston.

9 Claims, 5 Drawing Figures

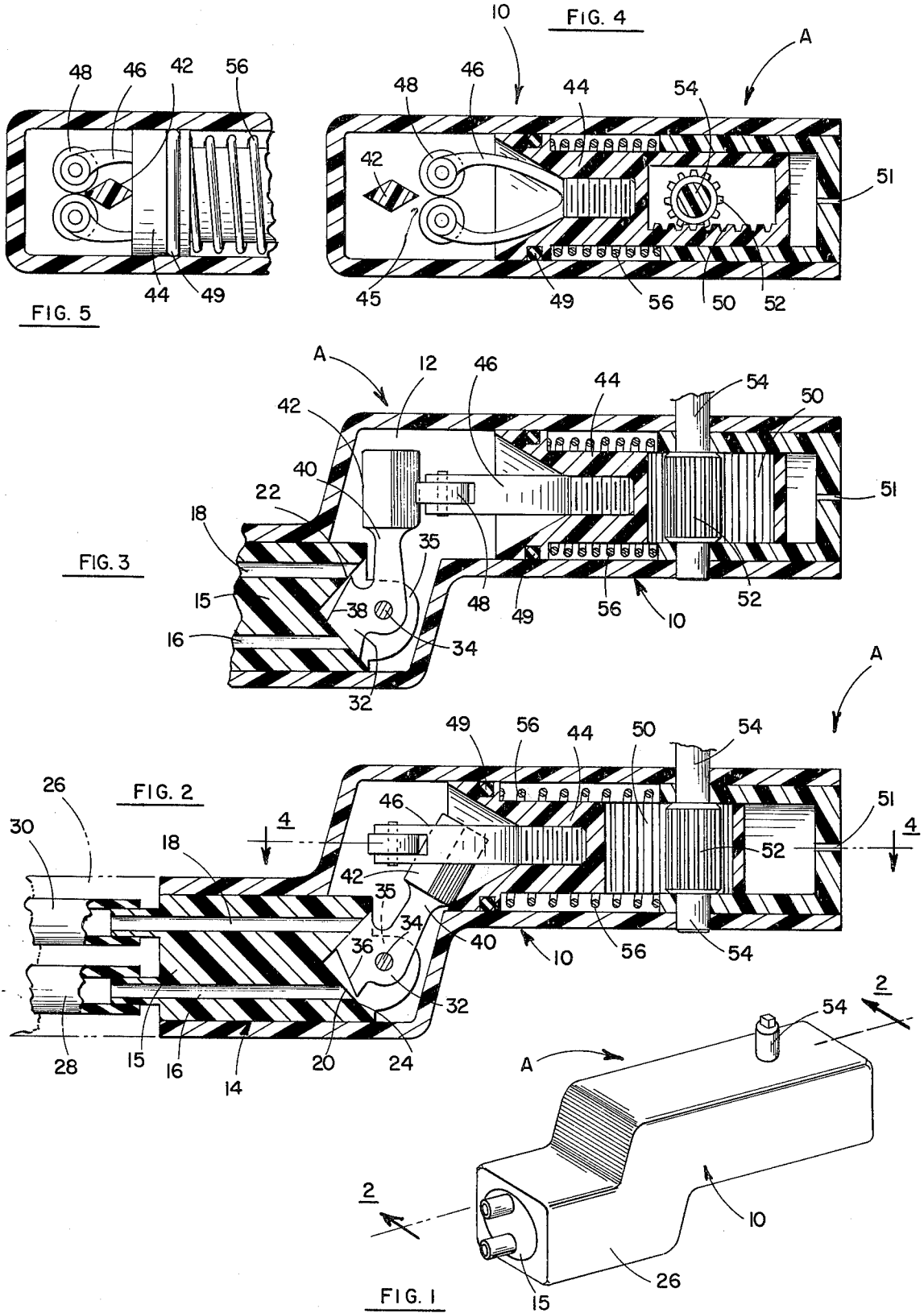

OSCILLATING ACTION FLUID MOTOR

BACKGROUND OF THE INVENTION

This invention relates in general to certain new and useful improvements in fluid operated motors, and more particularly, to fluid operated motors which provide an oscillating action power output.

There are several forms of fluid motors which are commercially available and are typically used in a wide variety of applications. Consequently, these fluid motors may adopt many forms of construction. In some cases, fluid under power is introduced into a chamber having a rotary vane member, which rotates in response to the fluid under pressure and provides a rotary power output. Other forms of fluid motors provide an oscillating or reciprocating action, as for example, those fluid motors which are used in windshield wiper systems and the like.

The various fluid operable motors which are presently available suffer from several disadvantages. In many cases, these motors are fairly complex and require a large number of movable parts. Consequently, these motors have not found widespread use in various areas wherein an inexpensive and simple fluid operable motor could be employed.

There has been a recognized need for a simple fluid operable motor which could be used in connection with various household functions, such as a dishwashing device which could be connected to the outlet tap of a conventional home water supply system. However, as indicated previously, there are no commercially available effective fluid motors upon which a brush or other cleaning device could be attached to fill this need.

It is therefore the primary object of the present invention to provide a fluid operable motor which provides an oscillating power output through an output shaft.

It is another object of the present invention to provide a fluid operable motor of the type stated which is highly reliable and yet can be constructed at a relatively low unit cost.

It is a further object of the present invention to provide a method of producing reciprocative movement through a fluid under pressure which reciprocatively operates a piston, and which, in turn, moves an output shaft.

With the above and other objects in view, my invention resides in the novel features of form, construction, arrangement, and combination of parts presently described and pointed out in the claims.

GENERAL DESCRIPTION

The present invention can be described in general terms as an oscillating action fluid motor. This fluid motor comprises a housing having an interior chamber. A valve means is disposed within the housing and is provided with a fluid port permitting communication with the interior chamber and thereby permits passage of fluid with respect to the chamber. A closure member is operable with respect to the port to periodically open and close the port to the interior chamber, and thereby permits fluid under pressure to enter the chamber. A reciprocating member is shiftable within the housing in response to introduction of fluid into the chamber. A connect-disconnect means provides operative connection between the reciprocating member and the closure member. This connect-disconnect means periodically operatively disengages and re-engages the closure member and the reciprocating member. In this way, a drive means is operable by the reciprocating member to provide an oscillating drive output.

The oscillating action fluid motor can be characterized in further detail in that the reciprocating member is a piston with means thereon to enable movement of the reciprocating member in response to fluid under pressure. A stem extends between and connects the connect-disconnect means and the closure member. Furthermore, a biasing means is operatively associated with the reciprocating member and urges the reciprocating member in an opposite direction. In this way, the reciprocating member urges fluid out of internal chamber when said second port is opened.

The fluid motor can also be characterized in further detail in that the valve means comprises a second port communicating with the interior chamber so that the first named port permits entry of fluid into the interior chamber. The second port permits discharge of fluid from the internal chamber, and in this way, the closure member is adapted to open one of the ports when it closes the other of the ports.

In a preferred aspect of the present invention, the connect-disconnect means comprises a clip which permits operative engagement and disengagement in a snap action at one end of the reciprocating member. Further, the clip permits operative disengagement of the member after the reciprocating member has moved from an initial position over a predetermined distance, and permits operative engagement when the reciprocating member returns to the initial position. The drive means preferably comprises a rack gear and pinion gear combination driven by the reciprocating member. An output shaft extends outwardly of the housing and is driven by the rack gear and pinion gear combination.

The present invention can also be described in general terms as a method of providing reciprocative powered movement through fluid under pressure. This method comprises the introducing of fluid under pressure through a port into a chamber. The fluid urges a piston member in a first direction. A port in the chamber is then closed with a closure member in the chamber and which is in operative connection with the piston member. The piston is automatically disconnected from the operative connection with the closure member after the piston has traveled a predetermined distance in the first direction. A power output member is rotated by the piston during movement in the first direction. The piston is then biased in a second direction substantially reverse to the first direction. Finally, the powered output member is rotated in an opposite direction when the piston moves in the second direction.

The method of providing reciprocative powered movement can be characterized in further detail in that the method comprises removing fluid from the interior chamber when the piston moves in the second direction. The method also comprises closing of the first named port with the closure member when the piston moves in the second direction simultaneously therewith. A second port is opened and which communicates with the interior chamber to permit discharge of fluid in the internal chamber through the closed port.

In a preferred aspect of the present invention the method comprises operatively reconnecting the piston member and the closure member when the piston member has moved in the second direction. An output shaft is then rotated in response to movement of the piston.

FIGURES

Having thus described the invention in general terms, reference will now be made to the accompanying drawings in which:

FIG. 1 is a perspective view of an oscillating action fluid motor constructed in accordance with and embodying the present invention;

FIG. 2 is a vertical sectional view taken along line 2—2 of FIG. 1, and showing the interior construction of the fluid motor;

FIG. 3 is a vertical sectional view, partially broken away, and similar to FIG. 2, except that a piston and valve member forming part of the fluid action motor are shown in different positions;

FIG. 4 is a horizontal sectional view taken along line 4—4 of FIG. 2; and

FIG. 5 is a fragmentary horizontal sectional view similar to FIG. 4, and showing the piston and valve member in a position relative to that shown in FIG. 3.

DETAILED DESCRIPTION

Referring now in more detail and by reference characters to the drawings, which illustrate a preferred embodiment of the present invention, A designates an oscillating action fluid motor comprising an outer housing 10. The housing 10 is somewhat tubular in construction, and includes an interior fluid receiving chamber 12, the latter preferably though not necessarily circular in cross section over a major portion of its length.

A valve mechanism 14 is disposed within the housing 10, in the manner as illustrated in FIG. 2 of the drawings, and is formed by a plug 15 sized and shaped to extend into the chamber 12. The plug 15 which is preferably a solid plastic member, is bored to include a fluid intake duct 16 and a fluid discharge duct 18. The fluid intake duct 16 communicates with the interior chamber 12 through an inlet port 20, and the fluid discharge duct 18 communicates with the interior chamber 12 through a discharge port 22 formed within a conically shaped valve seat 24.

The housing may be provided with a handle 26 which may be sized and shaped to be grasped by the hand of an operator for easy manipulative movement of the entire fluid motor A. In addition, the handle 26 may be provided with a fluid intake pipe 28, which may be connected to and in fluid communication with the fluid intake duct 14. In like manner, the handle 26 would be provided with a fluid discharge pipe 30, which may be connected to and in fluid communication with the fluid discharge duct 18, in the manner as illustrated in FIG. 2 of the drawings.

The fluid intake pipe 28 may be provided with an adapter (not shown) for connection to the outlet tap in a conventional home water supply system, and the fluid discharge pipe 30 may be provided for connection to a sewer or other discharge system in the home water supply system. These pipes 28 and 30 are preferably formed of a flexible material, as for example, any of a number of known rubber or plastic materials. Typically, the pipes 28 and 30 may be commercially available and conventional rubber hoses, tubing, or the like.

A valve closure member 32, often referred to as an "actuating member," is disposed within the housing and is rockable on a pin 34 which extends transversely between a pair of spaced apart ears 35 formed integrally with the plug 15, in the manner as illustrated in FIGS. 2 and 3 of the drawings. The valve closure member 32 is provided with a sealing face 36 and a opposite sealing face 38, which respectively and alternately close fluid flow through the fluid intake duct 20 and the fluid discharge duct 22. In this respect, the angle between the faces of the valve seat 24 should be less than 90°, preferably about 88°, and the angle between the sealing faces 36 and 38 should be greater than 90°.

When the sealing member 32 is located in the position, as illustrated in FIG. 2 of the drawings, it can be observed that the fluid intake port 20 is located in fluid communication with the interior chamber 12, thereby permitting entry of fluid under pressure into the chamber 12. It can further be observed that when the sealing member 32 is in this position, the sealing face 38 has closed the discharge port 22, thereby preventing any discharge of the fluid from the interior chamber 12. In like manner, when the sealing member 32 assumes the position as illustrated in FIG. 3 of the drawings, the inlet port 20 is closed by means of the sealing face 36, and the discharge port 22 is opened, thereby permitting discharge of any fluid within the interior chamber 12.

Integrally formed with and extending upwardly from the sealing member 32 is an actuating rod 40, which is provided at its upper end with an enlarged trapezoidally shaped head 42. However in many cases, the head 42 could be circular in shape. The head 42 of the actuating rod 40 is alternately engageable and disengageable with the left-hand end of a piston 44, reference being made to FIG. 2 of the drawings. It can be observed that the piston 44 is provided at this left-hand end with a clip 45 having a pair of somewhat resilient arms or fingers 46 for releasably engaging the enlarged head 42. In addition, the outer ends of the arms 46 may be provided with rollers 48 for riding over the side walls of the enlarged head 42.

In this way, it can be observed that the enlarged head 42 may be enclosed within the arms 46 so as to be movable with the piston 44. By further reference to FIGS. 3 and 5, it can be observed that the arms 46 are sufficiently resilient so that they can separate and shift beyond the enlarged head 42 with a snap-type action. The piston 42 is provided with a cylindrical sealing ring 49, which is movable with the piston 42, and bears against the interior walls of the interior chamber 12 in a snug fitting but slidable and liquid tight engagement therewith. In this respect a vent port 51 is formed within the housing 10 on the downstream side of the piston 42.

Connected to or otherwise integrally formed with the piston 42 and being shiftable therewith, is a rack 50, which is disposed in meshing engagement with a pinion gear 52 mounted upon an output shaft 54, in the manner as illustrated in FIGS. 2 and 3 of the drawings. Thus, it can be observed that when the piston 44 is shifted to the right, the rack 50 in engagement with the pinion gear 52 will rotate the output shaft 54 in one direction. However, when the piston 44 is shifted to the left, the rack 50 will rotate the pinion gear and hence the output shaft 54 in the opposite direction, thereby providing an oscillating fluid action output. A compression spring 56 is disposed within the housing and biases the rack 50 and hence the piston 44 to the left against the action of any fluid pressure within the interior chamber 12.

In use, it can be observed that the fluid motor A can be connected to any suitable source of fluid, which may be a household water supply or the like. In this respect, it should be observed that the fluid motor A is also effectively operable with other forms of fluid such as air or other gases or liquids. When the fluid enters through the fluid intake duct 16 and through the discharge port 20, the fluid will enter into the interior chamber 12 of the housing 10 and force the piston 44 to the right. As this occurs, the rack 50 will rotate the pinion gear and hence the output shaft 54 in one direction. Furthermore, as this occurs, it can be observed that the discharge port 22 will be closed by the sealing face 38, in the manner as illustrated in FIG. 2 of the drawings.

After the piston 44 has shifted to a predetermined position, the fingers 46 will be forced to extend outwardly beyond the enlarged head 42 of the actuating rod 40, and in a snap-type action will separate the piston 44 from the actuating rod 40. The rollers 48 on the arms 46 will ride over the enlarged head and, due to the shape thereof, and particularly the trapezoidal shape thereof, will actually create a form of camming action to bias the actuating rod 40 to the left, reference being made to FIG. 3, to create this snap-type action. As this occurs, the actuating rod 40 will be shifted to its upright position, as illustrated in FIG. 3 of the drawings, thereby closing the intake port 20 with the sealing face 36, and also simultaneously therewith opening the discharge port 22 to the interior chamber 12. Fluid will then leave the interior chamber 12 through the discharge port 22 and the fluid discharge duct 18.

When the fluid under pressure no longer biases the piston rod to the right, the compression spring 26, which has been compressed by the shiftable movement of the piston 44, will then urge the rack 50 and the piston 44 to the left. This action of biasing the piston 44 to the left will cause the rollers 48 on the fingers 46 to engage and move around the walls of the trapezoidally shaped head 42 so that the fingers 46 once again engage the head 42, in the manner as illustrated in FIG. 5 of the drawings. As this occurs, the actuating rod 40 and the head 42 will be pulled to the right, that is to the position as illustrated in FIG. 2, and thereby again open the port 20.

It can be observed that when the piston 44 and the rack 50 shift to the left pursuant to the biasing action of the compression spring 56, the pinion gear 52 will rotate the output shaft 54 in the opposite direction. Moreover, when the piston does reach its left-hand end of travel, and engages the actuating rod 40, that the entire action will take place again. In this way, the piston 44 is continuously shifted to the right and to the left to thereby provide the oscillating action on the output shaft 54. Thus, it can be observed that this type of continuous movement developes an oscillating output power to provide both clockwise rotation and counterclockwise rotation of the output shaft 54.

The fluid action motor A is a highly effective device for use with water outlets as in a kitchen sink so that a brush, for example, can be attached to the output shaft 54. In this way, the fluid action motor A can be effectively used as a cleaning utensil. Again, other forms of attachments could be connected to the output shaft 54 so that the fluid action motor A could be used in a wide variety of applications.

Furthermore, it can be observed that every component in the housing can be molded or otherwise formed from any of a known number of synthetic resin or plastic materials, including, for example, nylon, polyethylene, polystyrene, several vinyl compounds and the like. In this way, the fluid action motor A can be very economically manufactured and assembled. However, it should be understood that the fluid action motor A could be constructed from other known materials, such as aluminum, steel or various other metals or the like.

Thus, there has been illustrated and described a novel fluid action motor which fulfills all of the objects and advantages sought therefor. It will become apparent to those skilled in the art, however, that many changes, modifications, variations and other uses and applications of the present invention are possible. Therefore, all such changes, modifications, variations and other uses and applications which do not depart from the spirit and scope of the invention are deemed to be covered by the invention, which is limited only by the following claims.

Having thus described my invention what I desire to claim and secure by letters patent is:

1. An oscillating action fluid motor comprising:
   a. a housing having an interior fluid receiving chamber,
   b. valve means within said housing and having a first fluid port in communication with said interior fluid receiving chamber and enabling passage of fluid into said chamber, and a second fluid port in communication with said interior fluid chamber and enabling passage of fluid out of said chamber,
   c. said valve means including a closure member operable with respect to said first and second ports to periodically shift to a first location to open said first port and close said second port to said interior chamber and thereby permit fluid under pressure to enter said chamber through said first port, said closure member also periodically shifting to a second location to open said second port and close said first port to said interior chamber and thereby permitting the fluid in said chamber to pass out of said chamber through said second port,
   d. a stem secured to said closure member and extending outwardly therefrom,
   e. an enlarged head on the outer end of said stem,
   f. a reciprocating member located within said housing and being in a first position when said closure member closes said second port and opens said first port, said reciprocating member being shiftable within said housing from said first position toward a second position when said closure member shifts from its first location toward its second location and closes said first port and where said closure member opens said second port,
   g. a somewhat resilient clip operatively connected to said reciprocating member and having resilient finger means which extend around and engage said enlarged head when said closure member closes said second port,
   h. a piston head on said reciprocating member and causing shiftable movement of said reciprocating member from said first position to said second position when fluid is introduced into said fluid receiving chamber through said first port,
   i. said movement of said reciprocating member toward said second position causing disengagement of said clip from said head in a snap-type action and thereby urging said closure member toward said first location where it opens said first port and closes said second port, a biasing means is operatively associated with said reciprocating member and urges said reciprocating member in an opposite direction and thereby urges fluid out of said interior chamber when said second port is opened, and j. drive means operable by said reciprocating member to provide an oscillating drive output.

2. The oscillating action fluid motor of claim 1 further characterized in that said reciprocating member is a piston with said piston head thereon to enable movement of said reciprocating member in response to fluid under pressure.

3. The oscillating action fluid motor of claim 1 further characterized in that said stem is fixedly secured to said closure member and the resilient arms of said clip urge said head and stem to shift said closure member to its second location to close said first port and open said second port when said arms separate from said enlarged head.

4. The oscillating action fluid motor of claim 1 further characterized in that said stem comprises an enlarged head on one end having a surface which enables a camming action which causes said clip to permit operative engagement and disengagement of said enlarged head in a snap action with respect to one end of said reciprocating member.

5. The oscillating action fluid motor of claim 4 further characterized in that said clip permits operative disengagement between said reciprocating member and said closure member after said reciprocating member has moved from an initial position over a predetermined distance and permits operative engagement when said reciprocating member returns to said initial position.

6. The oscillating action fluid motor of claim 1 further characterized in that said drive means comprises a rack gear and pinion gear combination driven by said reciprocating member.

7. The oscillating action fluid motor of claim 1 further characterized in that said drive means comprises a rack gear and pinion gear combination driven by said reciprocating member, and that an output shaft extends outwardly of said housing and is driven by said rack gear and pinion gear combination.

8. A method of providing reciprocative powered movement through fluid under pressure, said method comprising:

a. introducing fluid under pressure through a first port into an interior chamber, b. urging a piston member from an initial first position with movement in a first direction toward a second position, c. shifting a closure member from a first location where said first port is open to said chamber to a second location and closing said first port with said closure member and which closure member is in operative connection with said piston member, said closure member opening a second port when in the second location, d. causing fluid in said chamber to pass out of said chamber when said second port is open and said first port is closed, e. disengaging a clip from an enlarged head operable with said closure member and thereby automatically disconnecting said piston from its operative connection with said closure member after said piston has traveled a predetermined distance in said first direction toward said second position, f. shifting said closure member toward said first location to open said second port and close said first port after disengagement of said clip from said enlarged head, g. rotating a power output member by said piston during movement in said first direction, h. biasing said piston in a second direction substantially reverse to said first direction and back toward said initial first position, i. rotating said powered output member in an opposite direction when said piston moves in said second direction, and j. re-engaging said clip with said enlarged head when said piston reaches its initial first position and where said closure member is in said first location.

9. The method of providing reciprocative powered movement of claim 8 further characterized in that the method comprises rotating an output shaft in response to movement of said piston.

* * * * *